United States Patent [19]
Keeler

[11] Patent Number: 5,850,807
[45] Date of Patent: Dec. 22, 1998

[54] ILLUMINATED PET LEASH

[76] Inventor: Russell R. Keeler, 363 Park Ave., Harleysville, Pa. 19438

[21] Appl. No.: 895,219

[22] Filed: Jul. 16, 1997

[51] Int. Cl.$^6$ .................................................. A01K 27/00
[52] U.S. Cl. .............................. 119/799; 362/32; 362/102
[58] Field of Search .................... 119/786, 787, 119/788, 791, 795, 799, 859; 362/32, 102

[56] References Cited

U.S. PATENT DOCUMENTS

| | | | |
|---|---|---|---|
| 3,935,443 | 1/1976 | Simmons . | |
| 4,334,503 | 6/1982 | Carey, Jr. | 119/786 |
| 4,513,692 | 4/1985 | Kuhnsman et al. | 119/795 |
| 4,887,552 | 12/1989 | Hayden | 119/795 |
| 5,054,428 | 10/1991 | Farkus | 119/29 |

Primary Examiner—Robert P. Swiatek
Assistant Examiner—James S. Bergin
Attorney, Agent, or Firm—Douglas E. Mackenzie

[57] ABSTRACT

An illuminated pet leash for allowing a pet owner to easily and remotely locate the pet leash. The device includes an elongated non-opaque tube having a bundle of optical fibers longitudinally disposed therein, a housing attached to a first end of the tube, a snap swively connected to a second end of the tube, an encoding/transmitting device for encoding and transmitting a plurality of output signals, a receiving/decoding device disposed within the housing for receiving and decoding the output signals and a light source coupled to the receiving/decoding device, the light source being disposed within the housing and further being disposed in lighting relationship to the bundle of optical fibers.

13 Claims, 3 Drawing Sheets

ILLUMINATED PET LEASH

BACKGROUND OF THE INVENTION

1. Field of the Invention

The present invention relates to illuminated leashes and more particularly pertains to a new illuminated pet leash for allowing a pet owner to easily and remotely locate a pet leash.

2. Description of the Prior Art

The use of illuminated leashes is known in the prior art. More specifically, illuminated leashes heretofore devised and utilized are known to consist basically of familiar, expected and obvious structural configurations, notwithstanding the myriad of designs encompassed by the crowded prior art which have been developed for the fulfillment of countless objectives and requirements.

Known prior art illuminated leashes include U.S. Pat. Nos. 4,887,552; 4,513,692, and 3,935,443.

While these devices fulfill their respective, particular objectives and requirements, the aforementioned patents do not disclose a new illuminated pet leash. The inventive device includes an elongated non-opaque tube having a bundle of optical fibers longitudinally disposed therein, a housing attached to a first end of the tube, a snap swively connected to a second end of the tube and a means for remotely energizing a light source, the light source being disposed within the housing and further being disposed in lighting relationship to the bundle of optical fibers.

In these respects, the illuminated pet leash according to the present invention substantially departs from the conventional concepts and designs of the prior art, and in so doing provides an apparatus primarily developed for the purpose of allowing a pet owner to easily and remotely locate the pet leash.

SUMMARY OF THE INVENTION

In view of the foregoing disadvantages inherent in the known types of illuminated leashes now present in the prior art, the present invention provides a new illuminated pet leash construction wherein the same can be utilized for allowing a pet owner to easily and remotely locate the pet leash.

The general purpose of the present invention, which will be described subsequently in greater detail, is to provide a new illuminated pet leash apparatus and method which has many of the advantages of the illuminated leashes mentioned heretofore and many novel features that result in a new illuminated pet leash which is not anticipated, rendered obvious suggested, or even implied by any of the prior art illuminated leashes, either alone or in any combination thereof.

To attain this, the present invention generally comprises an elongated non-opaque tube having a bundle of optical fibers longitudinally disposed therein, a housing attached to a first end of the tube, a snap swively connected to a second end of the tube and a means for remotely energizing a light source, the light source being disposed within the housing and further being disposed in lighting relationship to the bundle of optical fibers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated pet leash apparatus and method which has many of the advantages of the illuminated leashes mentioned heretofore and many novel features that result in a new illuminated pet leash which is not anticipated, rendered obvious, suggested, or even implied by any of the prior art illuminated leashes, either alone or in any combination thereof.

It is another object of the present invention to provide a new illuminated pet leash which may be easily and efficiently manufactured and marketed.

It is a further object of the present invention to provide a new illuminated pet leash which is of a durable and reliable construction.

An even further object of the present invention is to provide a new illuminated pet leash that is capable of being manufactured from low cost materials and is thereby economically available to the buying public.

Still yet another object of the present invention is to provide a new illuminated pet leash which provides in the apparatuses and methods of the prior art some of the advantages thereof, while simultaneously overcoming some of the disadvantages normally associated therewith.

Still another object of the present invention is to provide a new illuminated pet leash for allowing a pet owner to easily and remotely locate the pet leash.

Yet another object of the present invention is to provide a new illuminated pet leash which includes an elongated non-opaque tube having a bundle of optical fibers longitudinally disposed therein, a housing attached to a first end of the tube, a snap swively connected to a second end of the tube and a means for remotely energizing a light source, the light source being disposed within the housing and further being disposed in lighting relationship to the bundle of optical fibers.

Still yet another object of the present invention is to provide a new illuminated pet leash that provides for added safety by illuminating the pet leash at night.

Even still another object of the present invention is to provide a new illuminated pet leash that is swively attachable to the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
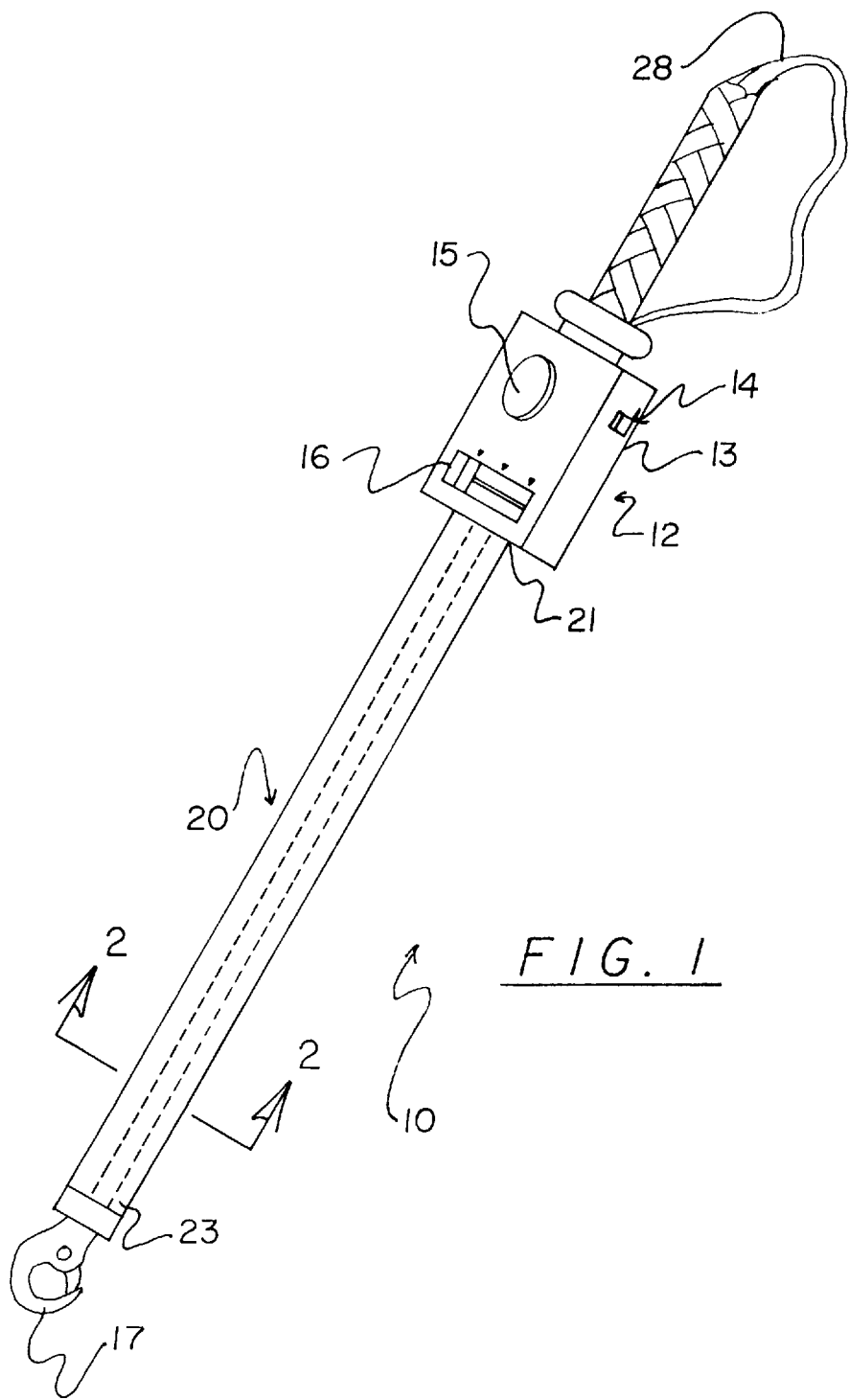
FIG. 1 is a perspective view of a new illuminated pet leash according to the present invention.

With reference now to the drawings, and in particular to FIGS. 1 through 5 thereof, a new illuminated pet leash embodying the principles and concepts of the present invention and generally designated by the reference numeral 10 will be described.

More specifically, it will be noted that the illuminated pet leash 10 comprises an elongated non-opaque tube 20 having a bundle of optical fibers 26 longitudinally disposed therein, a housing 13 attached to a first end 21 of the tube 20, a snap 17 swively connected to a second end 23 of the tube 20 and a means for remotely energizing a light source 51, the light source 51 being disposed within the housing 13 and further being disposed in lighting relationship to the bundle of optical fibers 26.

With reference to FIG. 1 there is shown the elongated non-opaque tube 20 which is preferably fabricated of plastic material. At the first end 21 of the tube 20 a control unit 12 including a housing 13 is attached by conventional means. A handle 28 is shown attached to the opposite end of the housing 13. A snap 17 is shown attached at the second end 23 of the tube. The snap 17 is swively attached by known means.

With continued reference to FIG. 1 the housing 13 further includes a single pole, triple throw switch 16, a push button switch 15 and a power switch 14 disposed thereon the purpose of which will be described hereinafter.

Figure 2:
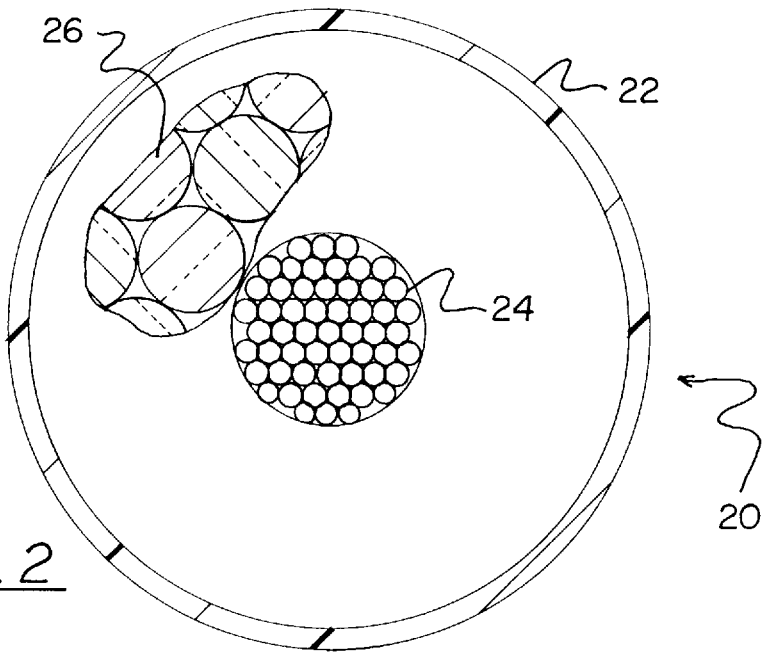
FIG. 2 is a cross sectional view thereof taken along line 2—2 of FIG. 1.

With reference to FIG. 2 the elongated non-opaque tube 20 includes a wall 22 for containing therein a steel cable 24 and the bundle of fiber optic fibers 26, shown in surrounding relationship to the steel cable 24.

Figure 3:
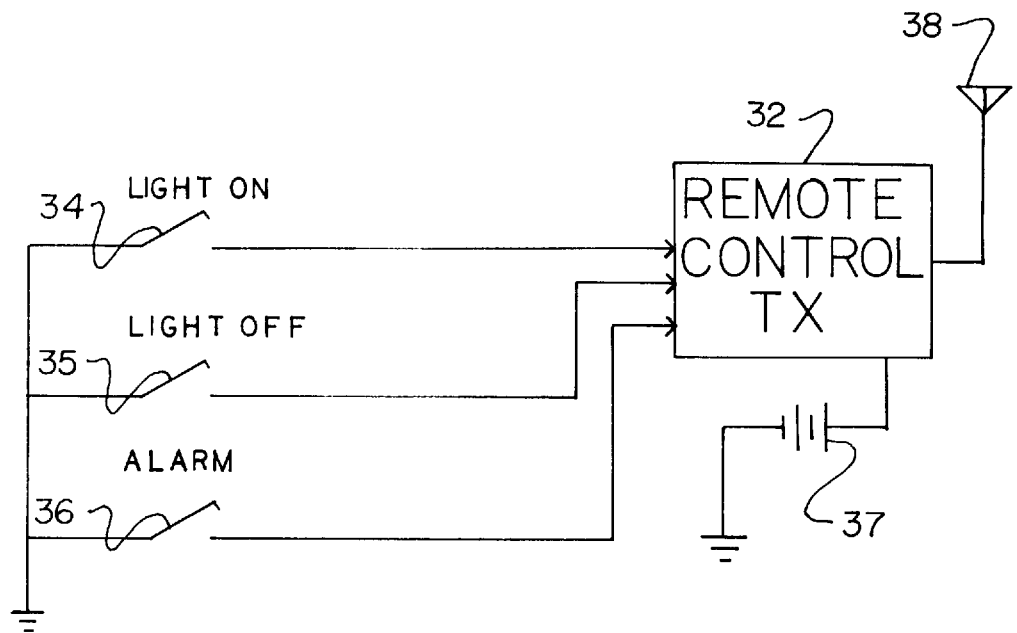
FIG. 3 is a schematic view of the encoder/transmitter circuit of the present invention.

With reference to FIG. 3 a remote encoding/transmitting means 32 of a type well known in the art is shown including a battery 37 and an antenna 38 operably connected thereto. Also shown are three on/off switches 34–36 for providing "light on", "light off" and "alarm" input signals respectively to the encoding/transmitting means 32.

Figures 4, 5:
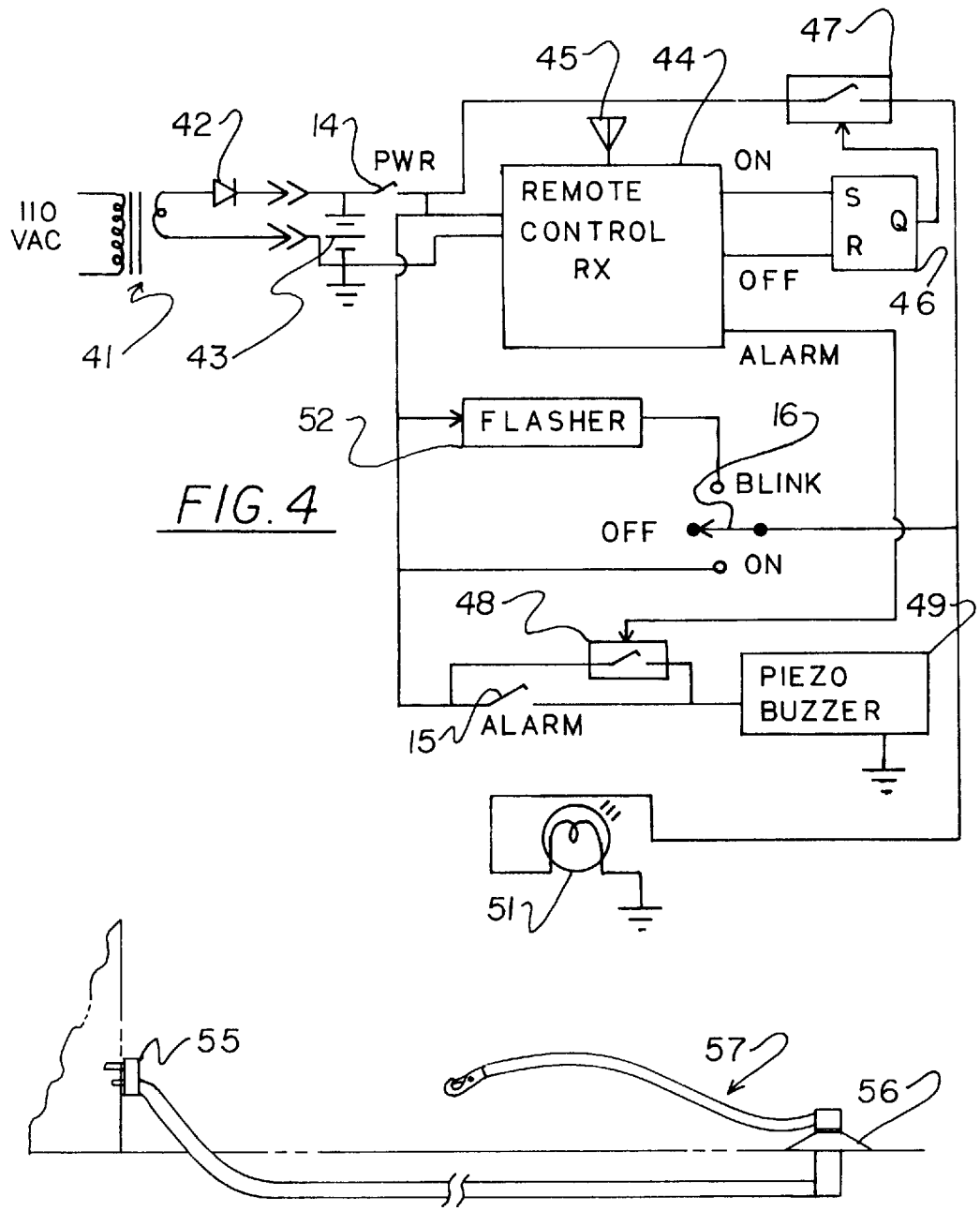
FIG. 4 is a schematic view of the receiver/decoder circuit and associated devices.
FIG. 5 is a plan view of an alternative embodiment of the present invention.

With reference to FIG. 4 there is shown the remote control receiving/decoding means 44 of a type well known in the art including a power source 43 and an antenna 45. The receiving/decoding means 44 and associated circuitry is disposed within the housing 13. In the preferred embodiment, the power source 43 is an rechargeable battery and a charging system including a transformer 41 and a diode 42 is shown. The receiving/decoding means 44 has output signals "ON", "OFF" and "ALARM" corresponding to the "light on", "light off" and "alarm" input signals. A Set/Reset flip flop switch 46 is shown operably coupled to "ON" and "OFF" outputs of the receiving/decoding means 44 at it's inputs for debouncing the output of the receiving/decoding means 44. The output of the Set/Reset flip flop switch 46 is shown coupled to a first electronic switch 47 operable to connect the light source 51 to the power supply 43. A first output signal ("ON") closes the first electronic switch 47 and a second output signal ("OFF") opens the first electronic switch 47. The light source 51 is disposed in lighting relationship to the bundle of fiber optic fibers 26 in a manner well known in the art.

With continued reference to FIG. 4 a second electronic switch 48 is shown operably connected to the receiving/decoding means 44. Upon receipt of an "alarm" signal, the receiving/decoding means 44 generates the "ALARM" output signal which closes the second electronic switch 48 thereby connecting an alarm means such as an audible alarm piezo buzzer 49 to the power supply 43.

The single pole, triple throw switch 16 is shown for selectively connecting the light source 51 to the power supply 43, disconnecting the light source 51 from the power supply 43 and connecting the light source 51 to the power supply 43 through a flasher means 52, such as a timer can or 555 timer circuit.

A first single pole, single throw switch 15 is provided for connecting the alarm means 49 to the power supply. The first single pole, single throw switch 15 is shown as a push button type switch.

A second single pole, single throw switch 14 is provided for selectively connecting and disconnecting the power supply 43 from the receiving/decoding means 44, the first electronic switch 47, the flasher means 52, the single pole, triple throw switch 16 and the first single pole, single throw switch 15.

An alternative embodiment of the present invention is shown in FIG. 5. In this embodiment the receiving/decoding means 44 and associated circuitry is swively attached to the ground by means of a swivel device 56 of the type well known in the art. A leash 57 of similar construction to the tube 20 extends from the swivel device 56. A wall mounted AC/DC adapter 55 is used as a power source.

In use the light source 51 and the alarm means of the illuminated pet leash 10 can be activated remotely by means of the encoding/transmitting means 32. This is particularly useful for finding the leash in the case where the housing is swively attached to the ground. Alternatively the light source 51 can be activated by means of the single pole, triple throw switch 16, including activation in a flashing manner, and the alarm means can be activated by means of the first single pole, single throw switch 15. The second single pole, single throw switch 14 is provided for powering the illuminated pet leash 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated pet leash comprising:
    an elongated non-opaque tube having a bundle of optical fibers longitudinally disposed therein;
    a housing attached to a first end of the tube;
    a snap swively connected to a second end of the tube; and
    a means for remotely energizing a light source, the light source being disposed within the housing and further being disposed in lighting relationship to the bundle of optical fibers.

2. The illuminated pet leash of claim 1, wherein the means for remotely energizing the light source further comprise a battery-powered remote control encoding and transmitting means for encoding and transmitting a plurality of signals to a remote control receiving and decoding means for generating a plurality of output signals, the receiving and decoding means being disposed within the housing, the remote control receiving and decoding means being operably connected to a power supply and to a first electronic switch disposed within the housing, the first electronic switch for connecting the light source to the power supply, the first electronic switch further being responsive to a first output signal that closes the first electronic switch and to a second output signal that opens the first electronic switch.

3. The illuminated pet leash of claim 2 further comprising a second electronic switch operably connected to the remote control receiving and decoding means, the second electronic switch for connecting an alarm means to the power supply, the second electronic switch being responsive to an alarm output signal.

4. The illuminated pet leash of claim 3 further comprising a first single pole, single throw switch operably connected to the alarm means for connecting the alarm means to the power supply.

5. The illuminated pet leash of claim 4 further comprising a second single pole, single throw switch operably connected to the power supply for selectively connecting and disconnecting the power supply from the remote control receiving and decoding means, the first electronic switch, the flasher means, the single pole, triple throw switch, and the first single pole, single throw switch.

6. The illuminated pet leash of claim 3, wherein the alarm means further comprise a piezoelectric buzzer.

7. The illuminated pet leash of claim 2 further comprising a set/reset flip flop switch operably connected at its inputs to the remote control receiving and decoding means, the set/reset flip flop switch for accepting the first and second output signals and having its output operably connected to the first electronic switch.

8. The illuminated pet leash of claim 2 further comprising a single pole triple throw switch operably connected to the light source for selectively connecting the light source to the power supply, disconnecting the light source from the power supply and connecting the light source to a flasher means, the flasher means being operably connected to the power supply.

9. The illuminated pet leash of claim 2, wherein the power supply further comprises a rechargeable battery.

10. The illuminated pet leash of claim 1 further comprising a handle attached to the housing opposite the first end of the tube.

11. The illuminated pet leash of claim 1, wherein the housing is swively attached to the ground.

12. The illuminated pet leash of claim 1 further comprising a steel cable disposed within the tube and attached at one of its ends to the housing and at the other of its ends to the second end of the tube.

13. An illuminated pet leash comprising:
    an elongated non-opaque tube having a bundle of optical fibers longitudinally disposed therein;
    a housing attached to a first end of the tube;
    a handle swively attached to the housing opposite the first end of the tube;
    a snap swively connected to a second end of the tube;
    a steel cable disposed within the tube and attached at one of its ends to the housing and at the other of its ends to the second end of the tube;
    a battery-powered remote control encoding and transmitting means for encoding and transmitting a plurality of signals to a remote control receiving and decoding means for generating a plurality of output signals, the remote control receiving and decoding means being disposed within the housing, the remote control receiving and decoding means being operably connected to a power supply and to a first electronic switch disposed within the housing, the first electronic switch for connecting the light source to the power supply, the first electronic switch further being responsive to a first output signal that closes the first electronic switch and to a second output signal that opens the first electronic switch;
    a second electronic switch operably connected to the remote control receiving and decoding means for connecting an audible alarm to the power supply, the second electronic switch being responsive to an alarm output signal;
    a set/reset flip flop switch operably connected at its inputs to the remote control receiving and decoding means, the set/reset flip flop switch for accepting the first and second output signals and having its output operably connected to the first electronic switch;
    a single pole, triple throw switch operably connected to the light source for selectively connecting the light source to the power supply, disconnecting the light source from the power supply and connecting the light source to a flasher means, the flasher means being operably connected to the power supply;

a first single pole, single throw switch operably connected to the audible alarm for connecting the audible alarm to the power supply; and a second single pole, single throw switch operably connected to the power supply for selectively connecting and disconnecting the power supply from the remote control receiving and decoding means, the first electronic switch, the flasher means, the single pole, triple throw switch, and the first single pole, single throw switch.

* * * * *